United States Patent
Green

[11] 4,052,752
[45] Oct. 11, 1977

[54] METHOD OF MAKING A DISPOSABLE GARMENT

[75] Inventor: Charles B. Green, Lewisburg, Pa.

[73] Assignee: International Paper Company, New York, N.Y.

[21] Appl. No.: 750,839

[22] Filed: Dec. 15, 1976

[51] Int. Cl.² ........................................ A41D 13/00
[52] U.S. Cl. ................................ 2/243 R; 2/DIG. 7
[58] Field of Search ............. 2/243 R, 243 A, 243 B, 2/114, DIG. 7

[56] References Cited

U.S. PATENT DOCUMENTS

| | | | |
|---|---|---|---|
| 3,156,927 | 11/1964 | Grimm et al. | 2/243 R |
| 3,380,074 | 4/1968 | Muto | 2/243 R X |
| 3,490,077 | 1/1970 | Brown | 2/243 R |
| 3,500,479 | 3/1970 | Pierron | 2/243 R |
| 3,585,641 | 6/1971 | Pierron | 2/243 R X |
| 3,594,821 | 7/1971 | Pierron | 2/243 R X |
| 3,678,516 | 7/1972 | Backer | 2/243 R X |
| 3,681,785 | 8/1972 | Truman | 2/243 R |
| 3,684,611 | 8/1972 | Craig | 2/243 R X |
| 3,694,817 | 10/1972 | Brown | 2/243 R |
| 3,696,445 | 10/1972 | Craig | 2/243 R |
| 3,699,591 | 10/1972 | Breitkopf et al. | 2/243 R |
| 3,719,955 | 3/1973 | Hrubecky | 2/243 R |
| 3,769,635 | 11/1973 | Pierron | 2/243 R |
| 3,858,243 | 1/1975 | Pierron et al. | 2/243 R |
| 4,000,521 | 1/1977 | Zoephel et al. | 2/DIG. 7 |

*Primary Examiner*—Alfred R. Guest
*Attorney, Agent, or Firm*—Ronald A. Schapira

[57] ABSTRACT

A method of making a disposable garment, which garment is generally intended for use under sterile conditions. The method includes cutting the body of the garment from a continuous web of material, the longitudinal axis of the body being in the cross direction of the web and the body having a central portion and having lateral portions adjacent to and separated from the central portion by fold lines essentially parallel to the longitudinal axis of the body; applying a pair of first adhesive stripes on the outer surface of the body; applying a sleeve on each first adhesive stripe to partially adhere the sleeves to the body; applying a second adhesive stripe on each sleeve, the second adhesive stripes being in line with the first adhesive stripes; folding the lateral portions of the body along the fold lines against the outer surface of the central portion of the body to completely adhere the sleeves to the body and to enclose the sleeves within the body, whereby the outer surface of the body and the sleeves are not susceptible to contamination prior to use of the garment. Preferably, the method also includes applying tie strings to the body of the garment.

16 Claims, 7 Drawing Figures

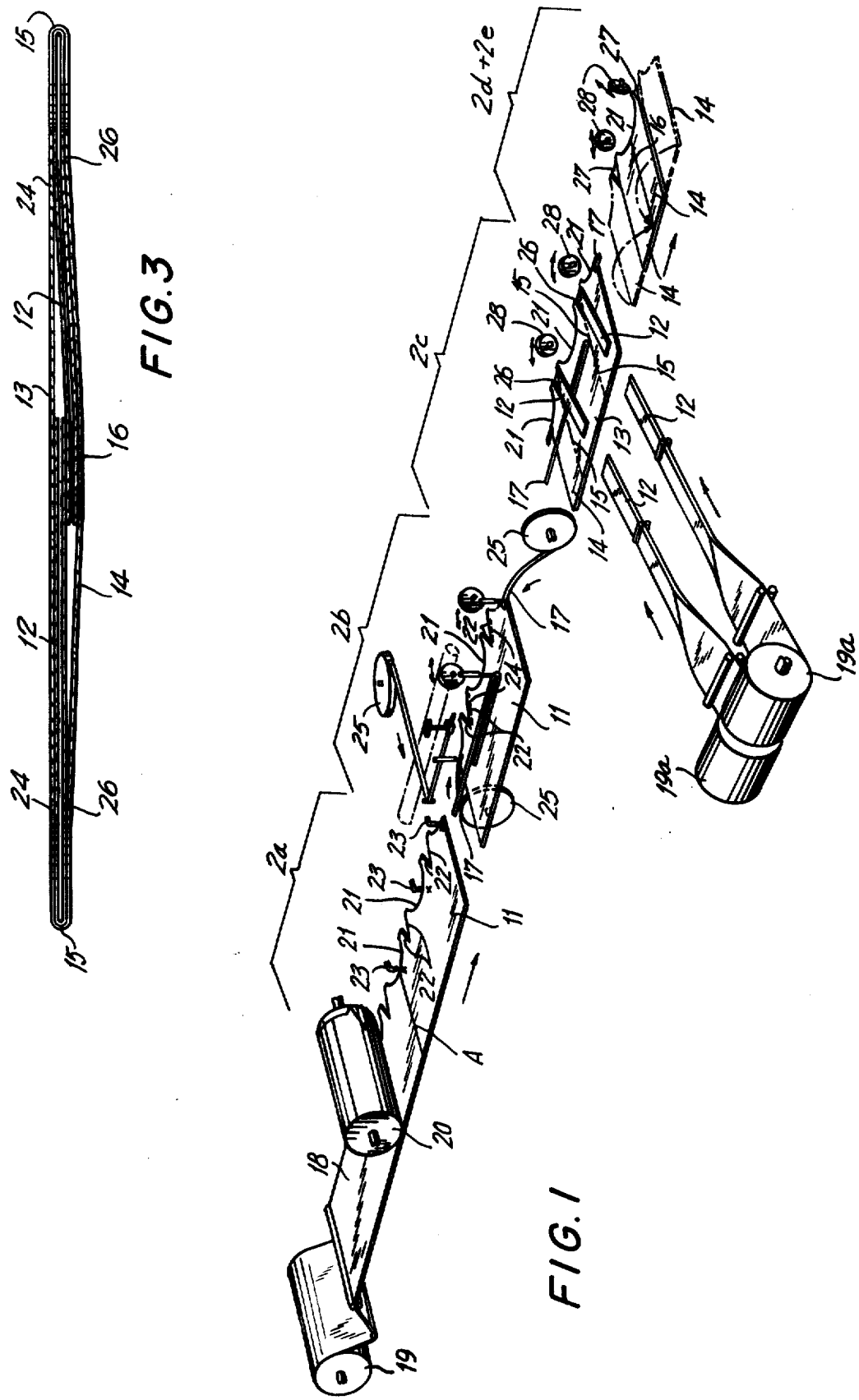

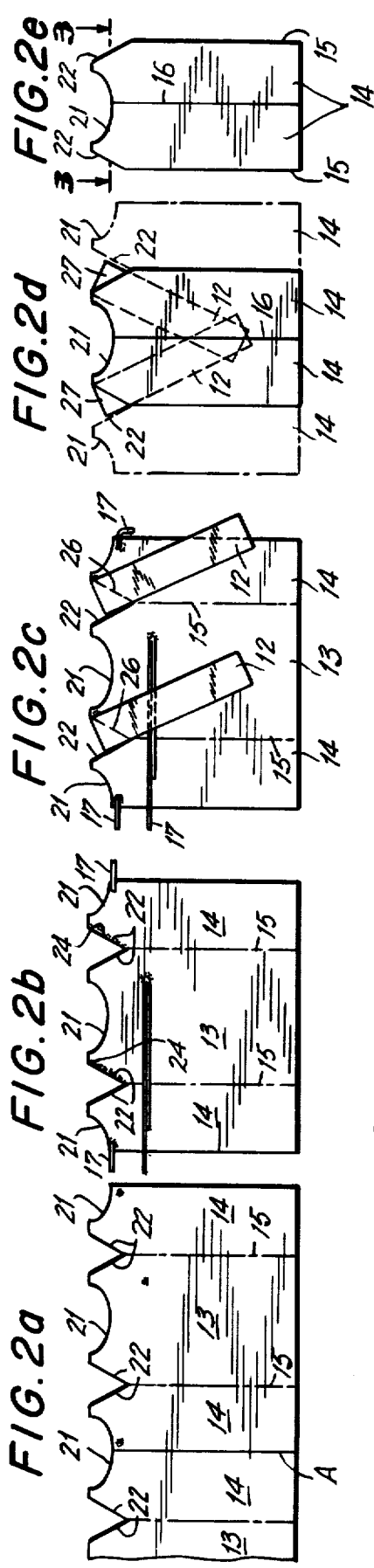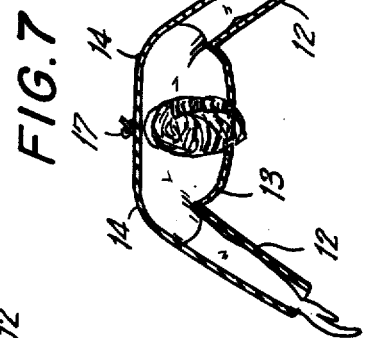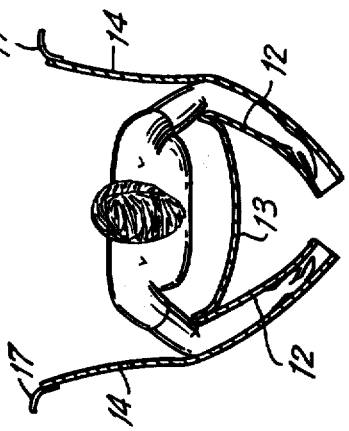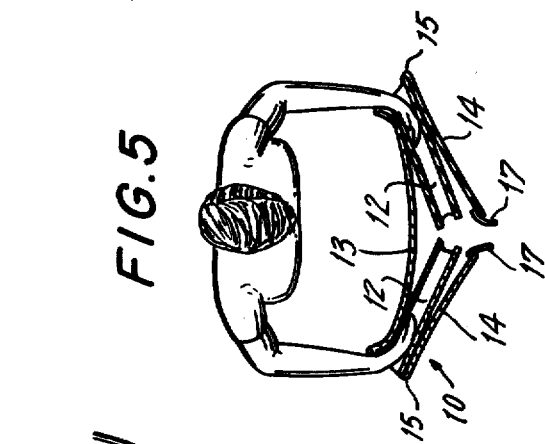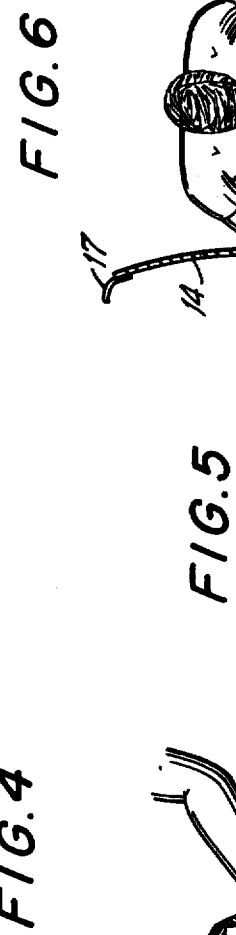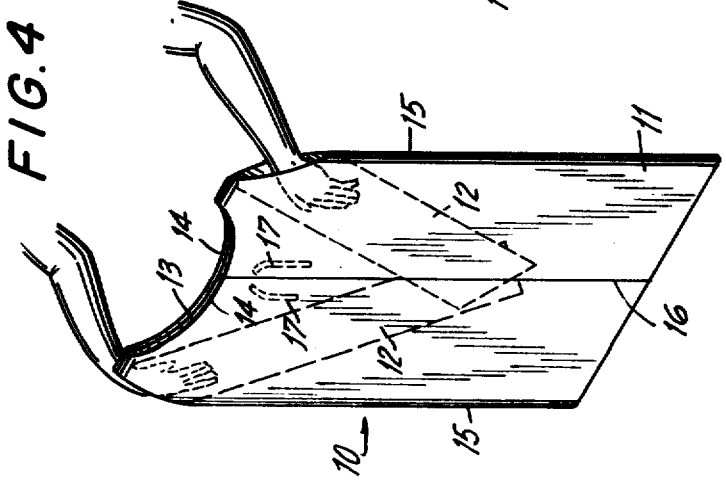

METHOD OF MAKING A DISPOSABLE GARMENT

BACKGROUND OF THE INVENTION

This invention relates to disposable garments and their method of manufacture. More particularly, this invention relates to a method of making disposable garments generally intended for use under essentially sterile conditions.

While disposable garments formed of paper, plastic, or relatively inexpensive cloth are becoming increasingly popular for a wide variety of uses, a particularly important use for such garments is in the medical field. Such garments are used under isolation conditions and after such use cannot be reused, so they are disposed of to reduce the danger of contamination. However, the advantages obtained in using a disposable garment, such as the savings in time by elimination of the need for sterilization, must be balanced against the cost of such garments. Thus, the method of making a disposable garment must not significantly increase the cost of such a garment; otherwise patients may be deprived of the advantages which disposability provides.

An object of this invention is to provide a disposable garment which is simple to make, which utilizes most of the material from which it is made without substantial waste, and which can be worn by users of different size.

Another object of this invention is to provide a disposable garment suitable as a hospital gown for use by hospital staff, patients, and others in essentially sterile or isolation areas of the hospital.

An additional object of this invention is to provide a method of making a disposable garment which will fit users having varying sleeve and torso lengths and which can easily be secured to the waist, neck, and/or cuff areas of the user.

An overall object of this invention is to provide a method of making a disposable garment, which method features relatively few steps that are capable of being carried out rapidly and efficiently, permits the making of the garment without substantial waste, and utilizes adhesives rather than more expensive sewing operations.

Another object of this invention is to provide a method of making a disposable gown which gown is not susceptible to contamination prior to use. One would not want to contaminate an isolation area of a hospital where a disposable gown is to be used by bringing into such an area contaminants from outside the area. Thus, it is advantageous to protect the outer surface of a disposable gown from contamination prior to use of the gown. With the method of this invention, the outer surface of a disposable gown is enclosed within the body of the gown prior to use and such contamination is avoided.

SUMMARY OF THE INVENTION

The present invention provides an economical method for mass producing disposable garments. Particularly, the method includes the steps of cutting the body of the garment from a continuous web of material, the longitudinal axis of the body being in the cross direction of the web and the body having a central portion and having first and second lateral portions separated by and adjacent to the central portion; applying a pair of first adhesive stripes to the body, one of the first adhesive stripes being applied to a selected one of the central and first lateral portions and the other of the first adhesive stripes being applied to a selected one of the central and second lateral portions; applying a sleeve on each first adhesive stripe to partially adhere the sleeves to the body; applying a first one of a pair of second adhesive stripes to a selected one of one of the sleeves and the portion of the body adjacent the portion to which the one of the first adhesive stripes is applied and a second one of the pair of second adhesive stripes being applied to a selected one of the other of the sleeves and the portion of the body adjacent the portion to which the other of the first adhesive stripes is applied; and folding the lateral portions against the central portion of the body, whereby the sleeves are completely adhered to and enclosed within the body.

BRIEF DESCRIPTION OF THE DRAWINGS

FIG. 1 schematically illustrates the various steps performed to make a disposable garment in accordance with one embodiment of the method of this invention.

FIGS. 2a-2e illustrate the disposable garment as it is being made by the various steps shown in FIG. 1.

FIG. 3 is a cross-sectional view through lines 3—3 of the disposable garment shown in FIG. 2e.

FIGS. 4-7 illustrate the steps taken by a user to put on the disposable garment shown in FIG. 2e.

DESCRIPTION OF THE PREFERRED EMBODIMENTS

Disposable garments made in accordance with the present invention may be formed of a non-woven or woven material, paper, plastic, cloth or any other suitable sheet material having the necessary properties of foldability, strength, and durability. Soft paper is particularly effective because of its "breathability" or permeability to air and because it may be produced to have characteristics similar to cloth. If necessary, its strength may be increased by incorporating reinforcing fibers therein, and other properties such as wet strength, moisture resistance, fire resistance, etc., may be imparted by suitable agents or coatings.

To understand the method of the present invention for making a disposable garment, reference should be made first particularly to FIGS. 4-7 which illustrate the garment to be made being put on by a user.

A garment 10 preferably includes a body 11 and sleeves 12, as shown in FIG. 4. Body 11 has portions which surround the front, sides, and back of the user. Particularly, the portion which surrounds the front of the user is a central portion 13 and the portions which surround the back of the user are lateral portions 14, which are best shown in FIG. 5. With regard to the portions of body 11 which surround the sides of the user, portions 13 and 14, as described in detail below, are integral and the adjacent areas of these portions will generally surround the sides of the user. Preferably, between these adjacent areas will be fold lines indicated as 15 in FIG. 4. It is apparent that front surrounding central portion 13 is complete and not open while lateral portions 14 while surrounding the user as shown in FIG. 7 are separated, as shown in FIG. 4, and form a slit 16.

Sleeves 12, as shown in FIG. 4, are enclosed within the body of the garment when it is made in accordance with this invention. By the steps of making the garment described in detail below, lateral portions 14 are folded against central portion 13 so that the outer surface of the garment and sleeves 12 are enclosed within the garment body and not susceptible to contamination prior to use of the garment.

Thus, when the garment is to be put on by the user, the arms are first inserted into the openings of the sleeves. Another person then moves lateral portions 14 of body 11 away from the user's body, as shown in FIGS. 5 and 6, and wraps portions 14 around the sides and back of the user. As shown in FIG. 7, means for securing portions 14 together to maintain the garment securely on the user's body are provided. The means particularly shown in FIG. 7 are tie strings 17.

The method of the present invention for making the disposable garment utilizes a material supplied as a continuous web for the making of garment body 11 and material supplied from two rolls for the making of garment sleeves 12 in the preferred embodiment of this invention.

For ease of understanding, the steps of the method schematically shown in FIG. 1 will be coordinated with the stage of preparation of the garment as it progresses through these steps, which is illustrated in FIGS. 2a-2e.

In accordance with the method of this invention, the disposable garment is made by first cutting body 11 from a single continuous web of material, so that the longitudinal axis of the garment is in the cross direction of the web, and by then applying sleeves 12 with adhesive to body 11, the sleeves being made from two rolls of material independent of the continuous web of material from which body 11 is cut.

As illustrated in FIG. 1, a continuous web of material 18 is dispensed preferably from a roll 19. Material 18 passes first to a cutting station where the bodies of the garments being produced are cut from the material. One aspect of this invention is the cutting of body 11 in the cross direction of material 18, which provides, for example, two advantages. First, waste of material is reduced because a cylindrical die can be used to cut more bodies from a particular length of the material than could be cut, if the bodies were not cut in the cross direction. Secondly, separation of one body from another and subsequent operation on the garment body is facilitated.

As shown in FIG. 1 in the area labeled "2a", a cylindrical die 20 cuts bodies 11 from material 18 as it is dispensed from roll 19 and also cuts sleeve openings and a neck recess in each body 11. To understand the manner in which die 20 cuts material 18, reference should be made to FIG. 2a, which shows the material cut by die 20 in the "2a" area of FIG. 1. In this drawing, two integrally connected bodies 11 are illustrated, one completely and the other in part. As material 18 is dispensed, die 20 cuts sequentially a partial neck recess 21 in lateral portion 14, a sleeve opening 22 in lateral portion 14, a sleeve opening 22 in central portion 13, a complete neck recess 21 in central portion 13, another sleeve opening 22 in central portion 13, a sleeve opening 22 in a second lateral portion 14, and a partial neck recess 21 in the second lateral portion 14. At this point, the above cutting sequence is repeated on the next body 11 integral with the first body 11. A line "A" between the bodies at the point where the bodies will be separated is indicated in FIG. 2a. Note that because the longitudinal axis of each body 11 is in the cross direction of the web of material 18, wastage of material between the bodies is eliminated.

Also in the "2a" area of FIG. 1, the above-mentioned fold lines 15 may be made in body 11. As shown in FIG. 2a, for instance, lines 15 separate central portion 13 from lateral portions 14 of body 11. Lines 15 preferably also intersect the lower edge of each of the sleeve openings 22 in both the lateral and central portions 14 and 13, which is of importance with regard to later steps of the method discussed below.

In the "2a" area of operation on the garment, the step of applying adhesive dots to body 11, so that tie strings 17 may be attached to body 11, is accomplished. Dots of adhesive are applied to pre-selected points on the surface of body 11, which points are each indicated by an "X" in FIG. 1. Preferably, the adhesive applying means are nozzles 23 shown in FIG. 1. It is within the skill of one versed in the art to select a particular adhesive for this purpose, which adhesive will be compatible with the materials from which the tie string and garment are made. Generally, the adhesives utilized will be, for example, of the thermosetting, pressure-sensitive, and/or air-drying type.

After material 18 is cut to form the integrally connected bodies 11 having the above-mentioned neck recesses and sleeve openings, the bodies are separated and an individual body 11 moves into the area of operation of FIG. 1 identified as "2b". In this step of the method of the present invention, tie strings 17 and a pair of first adhesive stripes, each stripe indicated as 24, are applied to body 11 of the garment being made.

As shown in FIG. 1, tie strings 17 are provided from rolls 25 and are later cut to a pre-selected length. Adhesive stripes 24 are applied preferably to the sleeve openings 22 of body 11 as shown in FIG. 2b.

Referring again to FIG. 1, after first adhesive stripes 24 have been applied to body 11, the body moves into the area of operation of FIG. 1 identified as "2c". In this area, the step of the method of the present invention of applying sleeves 12 to body 11 is accomplished. Each sleeve 12 is formed from a roll of material, indicated by 19a in FIG. 1. The sleeves are placed upon body 11, as shown in FIG. 2c, and are then partially adhered to body 11. Another aspect of this invention is that sleeves 12 need not be preformed or placed in exact registration with the sleeve openings 22 of body 11 because the portions of the sleeves not in registration with openings 22 will be cut off in a later step of the method. Thus, the sleeves can be applied as shown in FIG. 2c or in other ways where they are more or less parallel to the longitudinal axis of body 11. By either applying a pressure upon sleeves 12 or otherwise securing the sleeves to first adhesive stripes 24, sleeves 12 are adhered to central portion 13 of body 11 and are thus partially adhered to the body.

A second pair of adhesive stripes, each being indicated as 26, is applied then to sleeves 12 in line with first adhesive stripes 24 as shown best in FIG. 2c. Generally, stripes 26, if sleeves 12 were flat, could be considered to be applied to the opposite surface of the sleeves so as to overlie stripes 24 with the sleeves therebetween.

After first and second adhesive stripes 24 and 26 have been applied to sleeves 12, the garment is moved into the final stages of operation so that the last steps of the method of this invention can be performed.

Referring again to FIG. 1, in the area labeled "2d & 2e", the portions of sleeves 12 lying between adjacent sleeve openings 22 of central and lateral portions 13 and 14 are cut off and lateral portions 14 are folded against central portion 13 of body 11 to completely adhere the sleeves to and enclose the sleeves within the body of the garment.

Preferably, lateral portions 14 are folded against central portion 13 prior to remnants 27, which lie between the adjacent sleeve openings, being cut off, as indicated in FIG. 2d. Generally, the preferred means for cutting off these remnants are circular cutters 28. It should be noted that this cutting operation requires no cutting through lines of adhesive.

As shown in FIG. 2e, once lateral portions 14 have been folded against central portion 13, sleeves 12 are completely enclosed within the body of the garment to eliminate susceptibility of the sleeves to contamination. FIG. 3 provides a cross-sectional view which also illustrates the sleeves enclosed within body 11.

By this folding step, sleeves 12 are also secured to second adhesive stripes 26 to completely adhere the sleeves to the body of the garment. It should be noted that the sleeves, as described above, have been attached to the outer surface of the garment, so that this outer surface can also be protected from contamination by being enclosed within the folded over portions of body 11. It is contemplated that the designation "outer surface" can mean either surface of the garment, if contamination of the garment is not a concern.

Several alternative sequences of the steps discussed above are also contemplated to be within the scope of this invention.

For example, lines 15 on which lateral portions 14 are folded against central portion 13 may be omitted, need not be parallel to the longitudinal axis of body 11, or need not intersect the lower edges of adjacent openings 22 as shown in FIGS. 2a-2e. It is important that lines 15 intersect the sleeve openings in this manner if the utmost accuracy in the folding of sleeve openings 22 of lateral portion 14 against sleeve openings 22 of central portion 13 is desired, as in the preferred embodiment of the method of this invention. Fold lines 15 may also be put into body 11 any time between the steps of cutting the body and folding lateral portions 14 against central portion 13.

Sleeves 12 may be precut and do not necessarily have to be formed from rolls 19a as shown in FIG. 1. Also, tie strings 17 and the dots of adhesive by which they are attached to body 11 may be applied in any step after body 11 has been cut and before lateral portions 14 are folded against central portion 13 to enclose the strings within the body together with sleeves 12.

Lastly, it should be noted that the adhesive stripes 24 and 26 and sleeves 12 can be applied in several alternate ways other than the one shown in this preferred embodiment of the method of this invention, so long as the sleeves are completely adhered to the body of the garment.

For instance, it is preferable that adhesive stripes 24 and 26 be essentially in line with each other after the garment has been made, but this can be obtained by several different ways. Adhesive stripes 24 and 26 can be directly applied to body 11 rather than adhesive stripes 26 being applied to sleeves 12, whereby upon folding lateral portions 14 against central portion 13, the sleeves are secured to the adhesive stripes to completely adhere the sleeves to body 11. In this event, adhesive stripes 26 could be applied to body 11 any time after the body has been cut and until folding over of lateral portions 14. Another alternative way of applying sleeves 12 to body 11 would be to cross the sleeves as they are applied to first adhesive stripes 24 on both of the sleeve openings 22 of central portion 13 and apply second adhesive stripes 26 to the sleeve openings 22 of both lateral portions 14 or apply the sleeves first to lateral portions 14 and then secure them to central portion 14.

Other alternative ways of making a disposable garment in accordance with the present invention will occur to those skilled in the art in view of the disclosure provided above.

What is claimed is:

1. A method of making a disposable garment comprising the steps of cutting the body of the garment from a continuous web of material, the longitudinal axis of the body being in the cross direction of the web and the body having a central portion and having first and second lateral portions separated by and adjacent to the central portion;

applying a pair of first adhesive stripes to the body, one of the first adhesive stripes being applied to a selected one of the central and first lateral portions and the other of the first adhesive stripes being applied to a selected one of the central and second lateral portions;

applying a sleeve on each first adhesive stripe to partially adhere the sleeves to the body;

applying a first one of a pair of second adhesive stripes to a selected one of one of the sleeves and the portion of the body adjacent the portion to which the one of the first adhesive stripes is applied and a second one of the pair of second adhesive stripes being applied to a selected one of the other of the sleeves and the portion of the body adjacent the portion to which the other of the first adhesive stripes is applied; and folding the lateral portions against the central portion of the body, whereby the sleeves are completely adhered to and enclosed within the body.

2. The method of claim 1 wherein the step of cutting the body of the garment comprises cutting sleeve openings and neck recesses in the body.

3. The method of claim 2 wherein the adhesive stripes are applied to the sleeve openings in the portions of the body to which the stripes are applied and to the areas of the sleeves overlying the sleeve openings in the portions of the body to which the sleeves are adhered.

4. The method of claim 3 wherein the step of cutting sleeve openings and neck recesses in the body comprises cutting a neck recess in the central portion, two sleeve openings in the central portion adjacent the neck recess of the central portion, a sleeve opening in each lateral portion adjacent a sleeve opening in the central portion, and a partial neck recess in each lateral portion, whereby upon folding the lateral portions against the central portion the sleeve openings and neck recesses of the lateral portions overlie the sleeve openings and neck recess of the central portion.

5. The method of claim 4 wherein one of the first adhesive stripes is applied to a first sleeve opening in the central portion, the other of the first adhesive stripes is applied to the sleeve opening in the lateral portion adjacent the second sleeve opening in the central portion, and each of the second adhesive stripes is applied to a sleeve overlying one of the first adhesive stripes.

6. The method of claim 1 wherein the adhesive stripes are applied to and the sleeves are adhered to the outer surface of the body and the lateral portions of the body are folded against the outer surface of the central portion of the body.

7. The method of claim 1 further comprising the step of attaching at least one tie string to the body of the garment, whereby the tie string secures the lateral portions together to maintain the garment securely on the user's body.

8. The method of claim 1 further comprising the step separating the body of the garment being cut from the continuous web of material from the following body being cut from the material.

9. The method of claim 1 further comprising the step of forming each sleeve from a roll of material.

10. The method of claim 1 further comprising the step of cutting off the remnants of the sleeves lying between the adjacent sleeve openings of the central and lateral portions of the body.

11. The method of claim 1 further comprising the step of making fold lines in the body of the garment, the fold lines being essentially parallel to the longitudinal axis of the body and separating the central and lateral portions and wherein the lateral portions are folded along the fold lines against the central portion of the body.

12. The method of claim 11 wherein the fold lines are made to intersect the lower edges of the adjacent sleeve openings in the central and lateral portions.

13. The method of making a disposable garment comprising the steps of cutting the body of the garment from a continuous web of material, the longitudinal axis of the body being in the cross direction of the web and the body having a central portion and having lateral portions adjacent to and separated by the central portion;

making fold lines in the body essentially parallel to the longitudinal axis of the body, the fold lines separating the central portion from the lateral portions;

applying a pair of first adhesive stripes on the outer surface of the body;

applying a sleeve on each first adhesive stripe to partially adhere the sleeves to the body;

applying a second adhesive stripe on each sleeve, the second adhesive stripes being in line with the first adhesive stripes;

folding the lateral portions of the body along the fold lines against the outer surface of the central portion of the body to completely adhere the sleeves to the body and to enclose the sleeves within the body, whereby the outer surface of the body and the sleeves are not susceptible to contamination prior to use of the garment.

14. The method of claim 13 further comprising the step of attaching at least one tie string to the body of the garment sometime after the body of the garment is cut from the material and before the lateral portions are folded against the central portion.

15. The method of claim 13 wherein the fold lines are made in the body of the garment sometime after the body is cut and before the lateral portions are folded against the central portions.

16. The method of claim 13 further comprising the step of cutting off any remnants of the sleeves lying outside of the body of the garment after the lateral portions have been folded against the central portion.

* * * * *